United States Patent [19]

Smith

[11] 4,129,510

[45] Dec. 12, 1978

[54] SULFUR-CONTAINING COMPOUNDS AND LUBRICANTS AND FUELS CONTAINING THEM

[75] Inventor: Donald M. Smith, Euclid, Ohio

[73] Assignee: The Lubrizol Corporation, Wickliffe, Ohio

[21] Appl. No.: 681,107

[22] Filed: Apr. 28, 1976

[51] Int. Cl.$^2$ ............................................. C10M 1/38
[52] U.S. Cl. ........................ 252/48.6; 260/440; 260/446; 260/447; 260/448.2 B; 260/438.1; 260/438.5 R; 260/439 R; 44/63; 44/70; 44/71; 44/76; 252/47.5; 252/56 D; 260/346.74; 260/544 X; 260/429.3; 260/429.5; 260/429 R; 260/429.9; 260/430; 260/431; 260/561 S; 260/326.5 S; 260/435 R; 562/594; 562/598; 560/152; 560/154
[58] Field of Search ............... 252/48.6, 56 D, 47.5; 260/346.8, 537 N, 537 S; 44/63, 70, 76, 71

[56] References Cited

U.S. PATENT DOCUMENTS

| | | | |
|---|---|---|---|
| 2,496,798 | 2/1950 | Kluge | 252/48.6 |
| 2,581,514 | 1/1952 | Chilcote | 252/537 S |
| 2,625,511 | 1/1953 | Rocchini | 260/346.8 R X |
| 2,733,235 | 1/1956 | Cross et al. | 260/537 N X |
| 2,884,379 | 4/1959 | Rudel et al. | 252/48.6 |
| 2,892,852 | 6/1959 | Koenig et al. | 252/48.6 X |
| 2,994,662 | 8/1961 | Calhoun et al. | 252/48.6 |
| 3,234,131 | 2/1966 | Morway | 252/56 D X |
| 3,256,187 | 6/1966 | Davis | 252/56 D X |
| 3,309,316 | 3/1967 | McNinch et al. | 252/47.5 |
| 3,340,236 | 9/1967 | Greenlee et al. | 260/346.8 R X |
| 3,471,518 | 10/1969 | Hager | 260/346.8 R X |
| 3,809,651 | 5/1974 | Crawford et al. | 252/47.5 |
| 3,936,472 | 2/1976 | Kinney et al. | 252/56 D X |
| 3,970,568 | 7/1976 | Hotten | 252/48.6 |
| 4,012,368 | 3/1977 | Hotten | 252/48.6 X |

OTHER PUBLICATIONS

"Hackh's Chemical Dictionary", 4th Edition; Grant, Julius; p. 27 alkyl, McGraw-Hill, Inc.; 1969.

Primary Examiner—Delbert E. Gantz
Assistant Examiner—Andrew Metz
Attorney, Agent, or Firm—James W. Adams, Jr.; Raymond F. Keller

[57] ABSTRACT

Sulfur-containing compounds of the formula

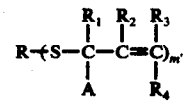

wherein R is a hydrocarbyl radical; each of $R_1$, $R_2$, $R_3$ and $R_4$ is independently hydrogen or a hydrocarbyl radical; m' is from one to about five; and each A is an alkyl radical containing at least one carboxyl group or functional derivative thereof, are useful as additives in lubricants and fuels.

36 Claims, No Drawings

SULFUR-CONTAINING COMPOUNDS AND LUBRICANTS AND FUELS CONTAINING THEM

FIELD OF THE INVENTION

This invention relates to new sulfur-containing compounds suitable for use as additives in lubricants and fuels and to lubricants and fuels containing the same. In another aspect, this invention concerns novel sulfur-containing reaction mixtures made by reacting certain mercaptans with certain carbonyl compounds to yield an intermediate which is subsequently reacted with certain carboxylic acids or functional derivatives thereof, these reaction mixtures being useful as additives in lubricants and fuels. This invention also relates to concentrates of these additives, to lubricant and fuel compositions comprising these additives, and to the processes for preparing the additives.

A principal object of the present invention is to provide new sulfur-containing compounds as well as a process for making them.

Another object is to provide novel, sulfur-containing additive compounds which exhibit rust-inhibiting and oxidation-inhibiting properties in lubricants and fuels when incorporated therein.

Still another object is to provide novel concentrates comprising these novel, sulfur-containing compositions of matter.

An additional object is to provide novel lubricant and fuel compositions comprising these sulfur-containing compositions of matter.

These and other objects of the invention are accomplished by providing compounds of the formula

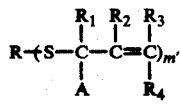

wherein R is a hydrocarbyl radical; each of $R_1$, $R_2$, $R_3$ and $R_4$ is independently hydrogen or a hydrocarbyl radical; m' is from one to about five; and each A is an alkyl radical containing at least one carboxyl group or functional derivative thereof.

The objects of this invention are also accomplished by providing a process and the sulfur-containing reaction mixtures of the process which comprises first reacting, in the presence of a catalytic amount of an acid (A) at least one mercaptan of the formula $R\text{-}(SH)_{m'}$ wherein R is a hydrocarbyl radical; and m' is from one to about five, with (B) at least one carbonyl compound of the formula

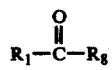

wherein $R_8$ is

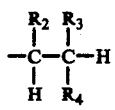

and each of $R_1$, $R_2$, $R_3$ and $R_4$ is independently hydrogen or a hydrocarbyl radical, to form an intermediate which is subsequently reacted with (C) at least one olefinic carboxylic acid or functional derivative thereof.

When reference is made in this specification and the appended claims to hydrocarbyl (for example, hydrocarbyl, hydrocarbyloxy, hydrocarbyl mercapto), it is to be understood, unless expressly stated to the contrary, that such reference is intended to include substantially hydrocarbyl groups (for example, substantially hydrocarbyl, substantially hydrocarbyloxy, substantially hydrocarbyl mercapto, and the like) as well as purely hydrocarbyl groups. The description of these groups as being substantially hydrocarbyl means that they contain no non-hydrocarbyl substituents or non-carbon atoms which would significantly affect the hydrocarbyl characteristics or properties of the group relevant to their uses as described herein. Thus, it is obvious, for example, in the context of this invention, that a purely hydrocarbyl $C_{20}$ alkyl group and a $C_{20}$ alkyl group substituted with a methoxy substituent would be substantially similar in its properties with regard to its use in this invention and would, in fact, be recognized as equivalents by those of ordinary skill in the art. That is, one of ordinary skill in the art would recognize both such groups to be substantially hydrocarbyl.

Non-limiting examples of substituents which do not significantly alter the hydrocarbyl characteristics or properties of the general nature of the hydrocarbyl groups of this invention are the following:

Ether groups (especially hydrocarbyloxy such as phenoxy, benzyloxy, methoxy, n-butoxy, etgc., and particularly alkoxy groups of up to ten carbon atoms)

Oxo groups (e.g., —O— linkages in the main carbon chain)

Nitro groups

Fluoro groups

Chloro groups

Thioether groups (especially $C_{1-10}$ alkyl thioether)

Thia groups (e.g., —S— linkages in the main carbon chain)

Carbohydrocarbyloxy groups

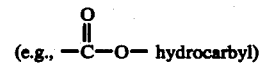

Sulfonyl groups

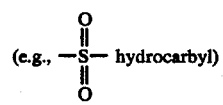

Sulfinyl groups

This list is intended to be merely illustrative and not exhaustive and the omission of a certain class of substituent is not meant to require its exclusion.

In general, if such substituents ar present, there will not be more than two for each ten carbon atoms in the substantially hydrocarbyl group and preferably not more than one for each ten carbon atoms since this number of substituents usually will not substantially affect the hydrocarbyl characteristics and properties of the group. Nevertheless, the hydrocarbyl groups usually will be free from non-hydrocarbon groups due to economic considerations; that is, they will be purely hydrocarbyl groups consisting of only carbons and hydrogen atoms.

In the above formula, R, $R_1$, $R_2$, $R_3$, $R_4$, and $R_8$ can be saturated or ethylenically unsaturated and when aliphatic, they can be straight or branched chain aliphatic. Examples of R, $R_1$, $R_2$, $R_3$, $R_4$, and $R_8$ include alkyl, alkenyl, cycloalkyl, aryl, arylalkyl, alkylaryl, alkylarylalkyl, cycloalkenyl, alkylcycloalkyl, cycloalkylalkyl, etc. Suitable specific examples include methyl, ethyl, n-propyl, isopropyl, n-butyl, isobutyl, amyl, isoamyl, n-hexyl, 2-ethylhexyl, 4-methyl-2-pentyl, cyclohexyl, chlorocyclohexyl, methylcyclohexyl, heptyl, n-octyl, tertiary octyl, nonyl, lauryl, cetyl, phenyl, bromophenyl, 2,4-dichlorophenylethyl, chlorophenyl, nitrophenyl, methoxyphenyl, ethylphenyl, propylphenyl, butylphenyl, benzylphenylethyl, benzyl, phenylpropyl, octenyl, cyclohexenyl, ethyl cyclopentyl, N,N'-dibutylaminopropyl-phenyl, 3-nitrooctyl, p-carbethoxyphenyl, phenoxyphenyl, naphthyl, alkylated naphthyl such as propylene tetramer-substituted naphthyl, acetyl phenyl, 2-ethoxyethyl, 6-ethylamino-heptyl, 4-cyanophenyl, 3,3,3-trifluoropropyl, dichloromethyl 3-thia-n-octyl, 2-methylmercapto-naphthyl, 4-ethylsulfonyl-n-butyl, 4-phenylsulfinyl, etc.

It will be apparent that these examples of the various "R" groups are subject to any specific qualifications for a particular "R" group as set forth elsewhere herein. For example, $R_8$ is described elsewhere as having a minimum of two carbon atoms; therefore, in that instance, it obviously cannot be methyl.

As noted above, R is a hydrocarbyl radical. Generally R contains up to about 50 carbon atoms and normally from about 6 to about 30 carbon atoms. Preferably, R is an aliphatic radical of from about 6 to about 20 carbon atoms. Usually R is alkyl or alkenyl of from about 6 carbon atoms up to about 20 carbon atoms.

$R_1$, $R_2$, $R_3$, and $R_4$ normally contain up to a total of about 30 carbon atoms. Usually each of $R_1$, $R_2$, $R_3$, and $R_4$ is independently hydrogen or a lower alkyl radical.

The term "lower" as used in the present specification and claims, when used in conjunction with a term such as alkyl, alkenyl, alkoxy, and the like, is intended to describe such radicals which contain a total of up to seven carbon atoms.

The radical "A", as noted above, can be an alkyl radical containing at least one carboxyl group or functional derivative thereof as a substituent. As used in the present specification and claims, "carboxyl group" describes the carboxylic acid radical —COOH. The radical "A" can contain between 3 and about 70, usually between 3 and about 40, carbon atoms. Radical "A" can be monobasic or polybasic; that is, it may contain one or more carboxylic groups or functional derivatives thereof. When it is polybasic, it usually contains 2 such carboxylic acid groups although it can have 3 or 4 such carboxylic acid groups. Preferably, the maximum number of carbon atoms in radical "A" is about 20. The functional derivatives of the carboxyl groups contemplated therein include anhydrides, esters, acylated nitrogen, acyl halides, metal salts, nitriles, etc., formed by reacting the aforesaid carboxyl groups or appropriate acylating functional derivative thereof with various types of mono- and polyamines, mono- and polyhydric alcohols, epoxides, ammonia, metal salts, etc., as described in further detail below in accordance with procedures and techniques known in the art.

The acylated nitrogen functional derivatives of the carboxyl groups of radical "A" are characterized by a nitrogen atom attached directly to an atom of the carboxyl group. It will be appreciated, of course, that the linkage formed between a nitrogen atom and a carboxyl group can be that of an amide, imide, amidine, or salt. Thus, the acylated nitrogen functional derivatives of the carboxyl groups of this invention are characterized by amide, imide, amidine, and salt linkages and, in many instances, mixtures of two or more of such linkages.

The novel sulfur-containing compositions of matter of this invention are made by reacting at least one mercaptan of the formula $R(SH)_{m'}$, wherein R and m' are as previously defined with at least one carbonyl compound of the formula

wherein $R_1$ and $R_8$ are as previously defined, to form an intermediate which is subsequently reacted with at least one olefinic carboxylic acid or functional derivatives thereof, as more fully described below.

The olefinic carboxylic acids or functional derivatives thereof used in preparing the novel sulfur-containing compositions of matter of the present invention may be either monobasic or polybasic in nature. When they are polybasic they are often dicarboxylic acids although tri- and tetracarboxylic acids can also be used. Generally, useful monobasic acids contain between 3 and about 40 carbon atoms in the acyl moiety while useful polybasic acids contain between 4 and about 40 carbon atoms in the acyl moiety. Usually the maximum number of carbons in the acyl moiety for either type of acid is about 20. Preferably, the total number of carbon atoms in the olefinic carboxylic acids or functional derivatives thereof will not exceed about 40. More preferably, the total will not exceed about 20.

The term "acyl moiety" as used in the present specification and claims is intended to describe that portion of the acid or functional derivative thereof derived from the carboxylic acid reactant. Thus, the acyl moiety of either

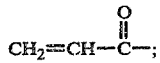

for dodecylsubstituted succinic acid or the analogous anhydride or imide; the acyl moiety is

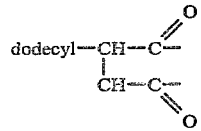

Exemplary of the mono-basic olefinic carboxylic acids used in preparing the novel sulfur-containing compositions of matter of this invention are those of the formula: $R_9COOH$ wherein $R_9$ has between 2 and up to about 39, preferably up to about 19 atoms and is further characterized by the presence of at least one ethylenically unsaturated carbon-to-carbon bond within its structure. $R_9$ can be aliphatic or alicyclic in nature and can contain other hydrocarbyl substituents such as aryl groups, alkylaryl, heterocyclic, etc. $R_9$ can contain 1 or more olefinic linkages and these can be conjugated or nonconjugated. $R_9$ containing only 1 olefinic linkage is preferred. Generally the acids correspond to the formula $R_{10}CH=CH(CH_2)_n \cdot COOH$ or

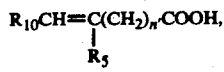

wherein $R_{10}$ is hydrogen or a saturated or ethylenically unsaturated aliphatic substituent and is usually hydrogen or a lower alkyl group, $n'$ is 0 to about 8 and $R_5$ is hydrogen or a lower alkyl group. Preferably these acids are $\alpha,\beta$-olefinic carboxylic acids, that is acids wherein the carbon-to-carbon double bond is adjacent to a carboxyl group or a functional derivative thereof.

Specific examples of useful $\alpha,\beta$-olefinic mono-basic carboxylic acids are acrylic acid, methacrylic acids, cinnamic acid, crotonic acid, 3-phenyl propenoic acid, $\alpha,\beta$-decenoic acid, etc. Non-$\alpha,\beta$-olefinic acids such as allyl acetic acid, oleic acid, linoleic acid, ricinoleic and linolenic acids can also be used.

As stated above, the olefinic carboxylic acid reactant used to prepare the novel sulfur-containing compositions of matter of this invention can be poly-basic, often di-basic, containing up to 40 carbon atoms. Among the preferred dibasic carboxylic acids are the $\alpha,\beta$-unsaturated acids. Exemplary poly-basic acids include maleic acid, fumaric acid, mesaconic acid, itaconic acid, citraconic acid, as well as dimerized and trimerized linoleic and oleic acids, often referred to as dimer and trimer acids.

As noted before, the acid reactants useful in preparing the novel sulfur-containing compositions of matter of the present invention are the acids per se, as exemplified above, or functional derivatives thereof such as the anhydrides, esters, acylated nitrogen, acyl halides, nitriles and metal salts of the afore-described acids. Methods of preparing such functional derivatives are well know to those of ordinary skill in the art and they can be satisfactorily described by noting the reactants used to produce them. Thus, for example, derivative esters for use in the present invention can be made by esterifying mono-hydric or polyhydric alcohols or epoxides with any of the afore-described acids. In general these mono- and polyhydric alcohols contain from 1 to about 30 carbon atoms, preferably 1 to about 20 carbon atoms. Exemplary aliphatic and alicyclic monohydric alcohols include methanol, ethanol, isopropanol, n-butanol, tertiary butanol, isooctanol, cyclopentanol, cyclohexanol, behenyl alcohol, hexacosanol, neopentyl alcohol, isobutyl alcohol, benzyl alcohol, beta-phenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, secondary pentyl alcohol, tertiary butyl alcohol, 5-bromo-dodec-5-enol, 3-nitrooctadecanol, the dioleate of glycerol, etc. Monohydric aliphatic alcohols, especially monohydric alkanols of up to about 20 carbon atoms, are usually employed. Lower monohydric alkanols such as ethanol, n-propanol, etc., are often used for reasons of economy.

Useful polyhydric alcohols generally contain from 2 to 10 hydroxy groups and 2 to about 30 carbon atoms. These include, for example, ethylene glycol, dipentylene glycol, triethylene glycol, tetraethylene glycol, dipropylene glycol, tripropylene glycol, dibutylene glycol, tributylene glycol, neopentyl glycol and other alkylene glycols in which the alkylene radical contains from 2 to about 8 carbon atoms. Other useful polyhydric alcohols include glycerol, monooleate of glycerol, monostearate of glycerol, monomethyl ether of glycerol, mannitol, sorbitol, pentaerythritol, di- and tri-pentaerythritol, lower alkyl esters of 9,10-dihydroxy stearic acid, 1,2-butanediol, 2,3-hexanediol, trimethylolpropane, 2,4-hexanediol, pinacol, erythritol, arabitol, sorbitol, annitol, 1,2-cyclohexanediol, xylene glycol, etc. Polyhydric alkanols of 2 to 6 hydroxyl groups and up to about 10 carbon atoms are often used due to availability and economic considerations.

The derivative esters can also be derived from unsaturated alcohols such as allyl alcohol, cinnamyl alcohol, propargyl alcohol, 1-cyclohexene-3-ol, oleyl alcohol, etc. Still other classes of the alcohols capable of yielding the esters of this invention comprises the ether-alcohols and amino-alcohols including, for example, the oxyalkylene-, oxy-arylene-, amino-alkylene-, and amino-arylene-substituted alcohols having one or more oxyalkylene, amino-alkylene or amino-arylene oxy-arylene radicals. They are exemplified by Cellosolve, Carbitol, phenoxyethanol, heptylphenyl-(oxypropylene)$_6$-H, octyl-(oxyethylene)$_{30}$-H, phenyl-(oxyoctylene)$_2$-H, mono(heptylphenyl-oxypropylene)-substituted glycerol, poly-(styrene oxide), amino-ethanol, 3-amino ethylpentanol, di(hydroxyethyl)amine, p-aminophenol, tri(hydroxypropyl)amine, N-hydroxyethyl ethylene diamine, N,N,N',N'-tetrahydroxy-trimethylene diamine, and the like. For the most part the ether-alcohols having up to about 15 oxyalkylene radicals in which the alkylene radical contains from 1 to about 8 carbon atoms are preferred. Generally the mono- and polyhydric alkanols of up to about 16 carbon atoms and 1 to 6 hydroxyl groups are preferred.

Suitable epoxides include especially the alkylene oxides such as ethylene oxide, propylene oxide, 1- and 2-butylene oxides and higher homologs of these having up to 20 carbon atoms. Cyclic epoxides such as 1,2-cyclohexenyl epoxide, styrene epoxide and 4-tertiary butyl epoxide can also be used, as can substituted epoxides such as 3-chloropropylene epoxide and 4-fluoro-1-butylene epoxide. Thio analogs (i.e., episulfides) of the above can also be used.

Similarly, acylated nitrogen functional derivatives of the afore-described olefinic carboxylic acids can also be used to make the novel sulfur-containing compositions of matter of this invention. Such acylated nitrogen derivatives are prepared from monoamino compounds, hydroxyamino compounds, polyamino compounds, and hydroxypolyamino compounds. For the purposes of this invention, hydrazines and organically substituted hydrazines are included within the various classes of amino compounds. Mixtures of these various amino compounds containing two or more of the foregoing amines can also be employed to make useful acylated amines.

Among the amines useful in preparing the acylated nitrogen derivatives for use in this invention are monoamines. These monoamines can be secondary, i.e., those containing an H-N< linkage (in other words, those containing only one hydrogen atom bonded directly to an amino nitrogen atom). More preferably, however, they contain at least one primary amino group, i.e., a group wherein an amino nitrogen atom is directly bonded to two hydrogen atoms. These amines are generally substituted with $C_{1-30}$ hydrocarbyl groups. Normally these hydrocarbyl substituents are aliphatic in nature and contain between one and ten carbon atoms. Saturated aliphatic hydrocarbyl substituents containing one to ten carbon atoms are particularly preferred, especially lower alkyl. The hydrcarbyl substituents of the above-described monoamines can be aliphatic, cycloaliphatic, and aromatic substituents (including aliphatic- and cycloaliphatic-substituted aromatic substituents and aromatic- and aliphatic-substituted cycloaliphatic substituents).

Among the monoamines useful in making the acylated nitrogen functional derivatives of the aforedescribed olefinic carboxylic acids used in making the novel sulfur-containing compositions of matter of the present invention are amines of the general formula $HNR_{11}R_{12}$ wherein $R_{11}$ is an alkyl group of up to ten carbon atoms and $R_{12}$ is a hydrogen atom or an alkyl group of up to ten carbon atoms. Another preferred class of monoamines are aromatic monoamines of the general formula $HNR_{13}R_{14}$ wherein $R_{13}$ is a phenyl, alkylated phenyl, naphthyl or alkylated naphthyl group of up to ten carbon atoms and $R_{14}$ is a hydrogen atom, an alkyl group of up to ten carbon atoms or $R_{13}$. Representative examples of these monoamines are ethyl amine, diethyl amine, n-butyl amine, di-n-butyl amine, allyl amine, isobutyl amine, coco amine, stearyl amine, lauryl amine, methyl lauryl amine, oleyl amine, aniline, paramethyl aniline, N-monomethyl aniline, diphenyl amine, benzyl amine, tolyl amine, methyl-2-cyclohexyl amine, etc.

Hydroxy amines are also included in the class of useful monoamines. Such compounds are the hydroxyhydrocarbyl-substituted amine analogs of the aforedescribed monoamines. The hydroxy monoamines have the following general formulae: $HNR_{15}R_{16}$ and $HNR_{17}R_{18}$, wherein $R_{15}$ is an alkyl or hydroxy-substituted group of up to ten carbon atoms, $R_{16}$ is a hydrogen atom or $R_{15}$, $R_{17}$ is a hydroxy-substituted phenyl, alkylated phenyl, naphthyl or alkylated naphthyl of up to ten carbon atoms and $R_{18}$ is a hydrogen atom or $R_{17}$ with the provisos that at least one of $R_{15}$ and $R_{16}$ and at least one of $R_{17}$ and $R_{18}$ is hydroxy-substituted.

Suitable hydroxy-substituted monoamines include ethanol amine, di-3-propanol amine, 4-hydroxybutyl amine, diethanol amine, n-methyl-2-propyl amine, 3-hydroxy aniline, N-hydroxyethyl-ethylene diamine, N,N-di(hydroxypropyl)propylene diamine, and tris(hydroxymethyl)methyl amine, etc. While, in general, those hydroxy amines containing only one hydroxy group will be employed as reactants, those containing more can also be used. Mixtures of two or more such hydroxy amines can also be used.

Heterocyclic amines are also useful in making the acylated nitrogen functional derivatives of the aforedescribed olefinic carboxylic acid, providing they contain a primary or secondary amino group. The cycle can also incorporate unsaturation and can be substituted with hydrocarbyl substituents such as alkyl, alkenyl, aryl, alkaryl or aralkyl substituents. In addition, the cycle can also contain other heteroatoms such as oxygen and sulfur or other nitrogen atoms including those not having hydrogen atoms bonded to them. Generally, these cycles have three to ten, preferably five to six ring members. Among such heterocycles are aziridines, azetindines, azolidines, tetra- and dihydropyridines, pyrroles, piperidines, imidazoles, indoles, di- and tetrahydroimidazoles, piperazines, isoindoles, purines, morpholines, thiamorpholines, N-aminoalkyl morpholines, N-aminoalkyl thiomorpholines, azepines, azocines, azonines, azecines and tetra-, di- and perhydroderivatives of each of the above, and mixtures of two or more of these heterocycles. Preferred heterocyclic amines are the saturated five- and six-membered heterocycle amines containing only nitrogen, oxygen, or sulfur in the cycle, especially piperidines, piperazines, thiamorpholines, morpholines and pyrrolidines, as discussed above. Piperidine, piperazine, morpholine, and pyrrolidine are particularly preferred.

Polyamines and hydroxy polyamines are also useful as amines for preparing the acylated nitrogen functional derivatives. Among these polyamines are alkylene polyamines including those conforming to the formula

$$H\text{-}R_7(\text{Alkylene-}NR_7)_nR_7$$

wherein n is from 1 to about 10; each $R_7$ is independently a hydrogen atom, a hydrocarbyl group or a hydroxy-substituted hydrocarbyl group having up to about 30 atoms, and the "Alkylene" group has from about 1 to about 10 carbon atoms. Especially preferred are the alkylene polyamines where each $R_7$ is hydrogen with the ethylene polyamines being the most preferred. Such alkylene polyamines include methylene polyamine, ethylene polyamines, butylene polyamines, propylene polyamines, pentylene polyamines, hexylene polyamines, heptylene polyamines, etc. The higher homologs of such amines and related aminoalkyl-substituted piperazines are also included.

Polyamines useful in preparing the acylated nitrogen derivatives include ethylene diamine, triethylene tetramine, tris(2-aminoethyl)amine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 1,3-bis(2-aminoethyl)imidazoline, 1-(2-aminopropyl)piperazine, 1,4-bis(2-aminoethyl)-piperazine, 2-methyl-1-(2-aminobutyl)piperazine, etc. Higher homologs as are obtained by condensing two or more of the above-illustrated alkylene amines are useful, as are mixtures of two or more of any of the aforedescribed polyamines.

Ethylene polyamines, such as those mentioned above, are especially useful for reasons of cost and effectiveness. Such polyamines are described in detail under the heading "Diamines and Higher Amines" in The Encyclopedia of Chemical Technology, Second Edition, Kirk and Othmer, Volume 7, pages 27–39, Interscience Publishers, Division of John Wiley and Sons, 1965, which is hereby incorporated by reference for their disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines. The mixtures are particularly useful in preparing novel sulfur-containing compositions of matter of this invention. On the other hand, quite satisfactory products can also be obtained by the use of pure alkylene polyamines.

Hydroxy polyamines, e.g., alkylene polyamines having one or more hydroxyalkyl substituents on the nitrogen atoms, are also useful in preparing amide or ester functional derivatives of the afore-described olefinic carboxylic acids. Preferred hydroxyalkyl-substituted alkylene polyamines are those in which the hydroxyalkyl group is a lower hydroxyalkyl group, i.e., having less than eight carbon atoms. Examples of such hydroxyalkyl-substituted polyamines include N-(2-hydroxyethyl)ethylene diamine, N,N'-bis(2-hydroxyethyl)ethylene diamine, 1-(2-hydroxyethyl)piperazine, monohydroxypropyl-substituted diethylene triamine, dihydroxypropyl-substituted tetraethylene pentamine, N-(3-hydroxybutyl)tetramethylene diamine, etc. Higher homologs as are obtained by condensation of the above-illustrated hydroxyalkyl-substituted alkylene amines through amino radicals or through hydroxy radicals as well as mixtures of the above are likewise useful.

The acylated nitrogen functional derivatives of the afore-described olefinic carboxylic acids useful in making the novel sulfur-containing compositions of matter of this invention can also be prepared from hydrazine or an organo-substituted hydrazine of the general formula

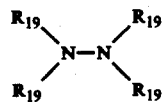

wherein each $R_{19}$ is independently hydrogen or a $C_1$-$C_{30}$ hydrocarbyl substituent with at least one $R_{19}$ being a hydrogen atom. Preferably, the other $R_{19}$'s are $C_1$-$C_{10}$ aliphatic groups. More preferably at least two $R_{19}$ groups are hydrogen. Most preferably, at least two $R_{19}$ groups bonded to the same nitrogen atom are hydrogen and the remaining $R_{19}$ groups are alkyl groups of up to ten carbon atoms. Examples of substituted hydrazines are methylhydrazine, N,N-dimethylhydrazine, N,N'-dimethylhydrazine, phenylhydrazine, N-phenyl-N'-ethylhydrazine, N-(p-tolyl)-N'-(n-butyl)hydrazine, N-(p-nitrophenyl)-N-methylhydrazine, N,N'-di-(p-chlorophenyl)hydrazine, N-phenyl-N'-cyclohexyl-hydrazine, etc.

Also among the useful acylated nitrogen functional derivatives are N-acrylo- and methacrylo-amino sulfonic acids such as those disclosed in U.S. Pat. No. 3,717,687 which is hereby incorporated by reference for its relevant disclosures.

Mixtures of two or more of the afore-described amines and polyamines can also be used in making the acylated nitrogen functional derivatives used in making the novel sulfur-containing compositions of matter of this invention.

Means for the preparation of ester and acylated nitrogen functional derivatives of the afore-described olefinic carboxylic acids from the afore-described alcohols and amines are conventional and well known to those of ordinary skill in the art and need not be described in detail here.

The ammonium salt acylated nitrogen functional derivatives can also be made from any of the afore-described amines as well as from tertiary amino analogs of them (i.e., analogs wherein the

groups have been replaced with

hydrocarbyl or

hydroxy hydrocarbyl groups), ammonia or ammonium compounds (e.g., $NH_4Cl$, $NH_4OH$, etc.) by conventional techniques well known to those of ordinary skill in the art.

The metal salt functional derivatives of the carboxylic acid reactants useful in making the novel sulfur-containing compositions of matter of the present invention can also be made by conventional techniques well known to those of ordinary skill in the art. Preferably they are made from a metal, mixture of metals, or a basically reacting metal derivative such as a metal salt or mixture of metal salts where the metal is chosen from Group Ia, Ib, IIa or IIb of the periodic table although metals from Groups IVa, IVb, Va, Vb, VIa, VIb, VIIb and VIII can also be used. The gegen ion (i.e., counter) of the metal salt can be inorganic such as halide, sulfide, oxide, carbonate, hydroxide, nitrate, sulfate, thiosulfate, phosphite, phosphate, etc., or organic such as lower alkanoic, sulfonate, alcoholate, etc. The salts formed from these metals and the acid products can be "acidic", "normal" or "basic" salts. An "acidic" salt is one in which the equivalents of acid exceed the stoichiometric amounts required to neutralize the number of equivalents of metal. A "normal" salt is one wherein the metal and acid are present in stoichiometrically equivalent amounts. An "overbased" salt (sometimes referred to as "superbased" or "hyperbased" salts) is one wherein the metal is present in a stoichiometric excess relative to the number of stoichiometric equivalents of carboxylic acid compounds from which it is produced. The production of the latter are well known to those of ordinary skill in the art and are described in detail in "Lubricant Additives" by M. W. Ranney, pages 67–77, which is hereby incorporated by reference for its relevant disclosures pertaining to methods for preparing overbased salts.

The acid halide functional derivative of the afore-described olefinic carboxylic acids can be prepared by the reaction of the acids and their anhydrides with a halogenation agent such as phosphorus tribromide, phosphorus pentachloride, or thionyl chloride. Esters can be prepared by the reaction of the acid halide with the aforesaid alcohols or phenolic compounds such as phenol, naphthol, octyl phenol, etc. Also, amides and imides and other acylated nitrogen derivatives can be prepared by reacting the acid halide with the above-described amino compounds. These esters and acylated nitrogen derivatives can be prepared from the acid halides by conventional techniques well known to those of ordinary skill in the art.

The nitrile functional derivatives of the afore-described carboxylic acids useful in making the condensation products of the present invention can be made by the conversion of a carboxylic acid to the corresponding nitrile by the dehydration of the amide. The preparation of the latter are well known to those of ordinary skill in the art and are described in detail in "The Chemistry of the Cyano Group" edited by Zvi Rappoport, Chapter 2, which is hereby incorporated by reference for its relevant disclosures pertaining to methods for preparing nitriles.

More specifically, the preferred alpha, beta-ethylenically unsaturated carboxylic acids or functional derivatives thereof useful as reactant (C) are of the formula selected from the group consisting of

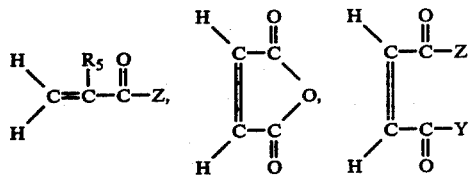

wherein $R_5$ is hydrogen or a lower alkyl radical, and each of Z and Y is independently a member selected from the group consisting of halo, $-OR_6$, $-OM$, $-O-(Alkylene-O)_n-R_6$, $-N(R_7)_2$, $-NR_7(Alkylene-NR_7)_nR_7$, $-ON(R_7)_4$, and $-ON(R_7)_3(Alkylene-NR_7)_n-R_7$, wherein n has an average value of about one to about ten; M is a metal cation as previously defined; each $R_6$ is independently hydrogen or a hydrocarbyl radical; each $R_7$ is independently hydrogen, a hydrocarbyl radical or a hydroxy-substituted hydrocarbyl radical; the "Alkylene" group has from about one to about ten carbon atoms; and Z and Y when taken together as part of the same reactant (C), form a $>NR_7$ or $>N-(Alkylene-NR_7)_nR_7$ group.

The radical "A" can now additionally be defined as the radical derived from the opening of an ethylenically unsaturated linkage in the above-described olefinic carboxylic acid reactants and functional derivatives thereof (e.g., (1)

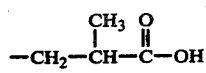

(derived from methacrylic acid)

(2)

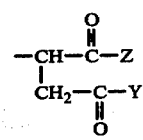

(derived from maleic acid, maleic anhydride, fumaric acid or from functional derivatives of maleic acid or anhydride wherein Z and Y are as previously defined).)

The mercaptans useful in this invention are also known materials and can be made by a number of conventional methods known to those of ordinary skill in the art. Examples of these methods are found in the text ORGANIC CHEMISTRY OF BIVALENT SULFUR, Volume I, by Reid, 1958, which is incorporated herein by reference for its disclosure of suitable mercaptans and methods of making the same. Also mercaptans prepared by the reaction of an olefin with hydrogen sulfide in the presence of a catalyst are described in U.S. Pat. Nos. 3,049,567; 2,928,880; 3,005,030 and 3,032,592 which are hereby incorporated by reference for their disclosure of useful mercaptans as well as their teachings of the preparations of suitable mercaptans.

The mercaptans useful in this invention are of the formula $R(SH)_{m'}$ wherein R is as previously defined and m' is from one to about five. The mercaptans may be primary, secondary, tertiary mercaptans and many of these materials are commercially available. The classification primary, secondary and tertiary mercaptans is analogous to that of alcohols where the alcohol is classified according to the kind of carbon that bears the hydroxyl group. The preferred mercaptans are the monmercaptans of the formula $R(SH)_{m'}$ wherein m' is equal to one. Some of the preferred mono-mercaptans include n-hexyl mercaptan, t-octyl mercaptan, n-octyl mercaptan, t-nonyl mercaptan, n-decyl mercaptan, t-dodecyl mercaptan, n-dodecyl mercaptan, t-tetradecyl mercaptan, t-hexadecyl mercaptan, cyclohexyl mercaptan, pinanyl mercaptan and the like. Mixtures of two or more such mercaptans can be used.

Polymercaptans of the formula $R(SH)_{m'}$ wherein m' is from two to about five are also useful in this invention. Typical polymercaptans which may be employed include dipentene dimercaptan (2,9-para-menthanedithiol); ethylcyclohexyldimercaptan (2-[3 or 4-mercapto cyclohexyl] ethanethiol); hexanedithiol-1,2; 2,6-dimethyloctanedithiol-3,7; pentadecanedithiol-7,8; 1,1-bis(-mercaptomethyl)cyclohexane; propanetrithiol-1,2,3; neopentanetetrathiol. Other useful polymercaptans may be found in the text ORGANIC CHEMISTRY OF BIVALENT SULFUR, Vol. 1, by Reid, 1958. Mixtures of two or more such polymercaptans can be used. Also, mixtures of one or more mono-mercaptans and one or more polymercaptans can be used.

The carbonyl compounds of this invention are the aldehydes and ketones corresponding to the formula

wherein $R_1$ and $R_8$ are as previously defined.
Aldehydes corresponding to the formula

wherein $R_1$ is hydrogen and $R_8$ is as previously defined, containing a total of from 3 to about 38, usually from 3 to about 20, carbon atoms are useful in this invention. Examples of aldehydes which are within the scope of this invention include propionaldehyde, n-butyraldehyde, isobutyraldehyde, n-valeraldehyde, isovaleraldehyde, alpha-methylbutyraldehyde, n-caprioicaldehyde, isocaprioicaldehyde, 2-ethylbutyraldehyde, methyl-n-propylacetaldehyde, ethylisobutyraldehyde, hexahydrobenzaldehyde, n-heptaldehyde, ethylisopropylacetaldehyde, 3,3-dimethylpentanal, 5-methylhexanal, caprylaldehyde, 2-ethylhexanal-1, pelargonaldehyde, 7-methyloctanal, methyl-n-hexylacetaldehyde, capraldehyde, di-n-propylacetaldehyde, 3-phenyl-2-methylpropanal, undecanal, dodecanal, tridecanal, tetradecanal, pentadecanal, hexadecanal, heptadecanal, stearaldehyde and the like. Mixtures of two or more such aldehydes can be used.

The ketones corresponding to the formula

wherein $R_1$ is not hydrogen and $R_8$ is as previously defined, containing a total of from 4 up to about 48, usually from 4 up to about 25 carbon atoms are useful in this invention. Examples of ketones which are in the scope of this invention include 2-butanone, 1-chloro-2-butanone, 2-pentanone, 2-methyl-3-butanone, 3-hexanone, 4-methyl-2-pentanone, cyclobutylmethylketone, 1-methoxy-2-pentanone, 2-heptanone, 4-heptanone, 2,2-dimethyl-3-pentanone, 2,4-dimethyl-3-pentanone, 3-ethyl-2-pentanone, 2-furylethylketone, 2,2,4-trimethyl-3-pentanone, 2-methyl-4-heptanone, 4,4-dimethyl-3-hexanone, 6-methyl-3-heptanone, 5-nonanone, 3,5-dimethyl-4-heptanone, phenylethylketone, 2-decanone, phenylisopropylketone, 6-undecanone, 5-phenyl-3-pentanone, 8-pentadecanone, di-n-decylketone, and the like. Mixtures of two or more such ketones can be used. Also, mixtures, of one or more aldehydes and one or more ketones can be used.

The inventive process for the formation of novel reaction products is achieved by contacting (i.e., reacting) one equivalent of the afore-described mercaptan with at least one mole of the afore-described carbonyl compound or mixtures thereof in the presence of a catalytic amount of acid to form an unsaturated intermediate believed to be a vinyl sulfide intermediate; e.g., one characterized by the grouping

The unsaturated intermediate is subsequently reacted at a ratio of one equivalent of the intermediate to from about 0.1 to about 5 moles, usually, 0.1 to about 1 mole, with the afore-described olefinic carboxylic acid or functional derivatives thereof.

The unsaturated intermediate as above-described may be halogenated, especially chlorinated, and the halogenated analogs used in lieu of all or a portion of the unsaturated intermediate in preparing the compositions of matter of this invention. The unsaturated intermediate and its halogenated analogs will be referred to collectively hereafter as "intermediate"; that is, intermediate is intended to be inclusive of both unless the context in which it is used clearly establishes that only one or the other is intended.

The halogenated unsaturated intermediate can be prepared by conventional techniques, well known to those of ordinary skill in the art. For example, the chlorinated unsaturated intermediate can be prepared by contacting (i.e., reacting) a 1:1 mole ratio of the unsaturated intermediate with chlorine at 100°–200° C. Excess chlorine may be used; for example, about 1.1 to about 3 moles of chlorine for each mole of unsaturated intermediate.

For purposes of this invention, one equivalent of the mercaptan is the molecular weight of the mercaptan divided by the number of mercapto groups. For example, one equivalent of a mercaptan having two mercapto groups would be the molecular weight of the mercaptan divided by two. Also, one equivalent of a mixture of one mercaptan having one mercapto group and one mercaptan having two mercapto groups would be the average molecular weight of the mercaptans divided by the average number of mercapto groups per molecule.

For purposes of this invention, the number of equivalents of the intermediate formed is assumed to be equal to the number of equivalents of mercaptan used as starting material.

In the inventive process, at least about one mole of carbonyl compound is used for each equivalent of mercaptan but an excess of carbonyl compound can be used and any unreacted carbonyl compound can be removed later as desired.

The reaction process for the preparation of the intermediate typically is carried out for a period long enough for the condensation to be substantially complete. The condensation can be considered substantially complete when water formation ceases. For practical purposes, one of ordinary skill in the art could determine this by standard techniques such as distillation, separation and the like. This reaction period could be about 0.5 to 72 hours, but is usually 0.5 to 24 hours at temperature of about 15° C. up to just below the decomposition temperature of any component of the reaction mixture, usually from 50° to 200° C.

Suitable substantially inert, organic liquid solvents or diluents may be used in the reaction process and include such relatively low boiling liquids as hexane, heptane, benzene, toluene, xylene, etc., as well as high boiling materials such as solvent neutral oils, bright stocks, and various types of synthetic and natural lubricating oil base stocks. Factors governing the choice and use of such materials are well known to those of skill in the art. Normally such diluents will be used to facilitate heat control, handling, filtration, etc. It is often desirable to select diluents which will be compatible with the other materials, which are to be present in the environment where the product is intended to be used.

As used in the specification and appended claims, the term "substantially inert" when used to refer to solvents, diluents, and the like, is intended to mean that the solvent, diluent, etc., is inert to chemical or physical change under the conditions in which it is used so as not to materially interfere in an adverse manner with the preparation, storage, blending and/or functioning of the compositions, additive, compound, etc., of this invention in the context of its intended use. For example, small amounts of a solvent, diluent, etc. can undergo minimal reaction or degradation without preventing the making and using of the invention as described herein. In other words, such reaction or degradation, while technically discernible, would not be sufficient to deter the practical worker of ordinary skill in the art from making and using the invention for its intended purposes. "Substantially inert" as used herein is, thus, readily understood and appreciated by those of ordinary skill in the art.

Although it is not necessary to use a solvent to prepare the intermediate, if one is used, it is advantageous to use one or more which form an azeotrope with water (e.g., benzene, toluene, xylene). It is possible then to heat the reaction mixture at reflux temperature and water can be azeotropically removed thus driving the reaction to completion. Other solvents or diluents as afore-described can also be used in combination with the azeotropic reaction mixture. Following the reaction, volatiles may be removed as by stripping, usually under vacuum, and the residue is filtered to yield a filtrate as the desired intermediate. If desired, the volatiles can remain as solvent for the next reaction step.

A catalytic amount of an acid is necessary to effect condensation of the mercaptan and carbonyl compound. Mineral and organic acids, such as phosphoric acid, sulfuric acid, hydrochloric acid, acetic acid, para-toluene sulfonic acid, formic acid, trichloro acetic acid, trifluoro acetic acid, nitric acid, etc., are useful acid catalysts in this invention. For the purposes of this invention, a catalytic amount of acid is from about 0.1 up to about 10%, usually from about 0.05 up to about 2% by weight, of the mercaptan.

The preparation of the novel sulfur-containing compositions of matter of this invention typically is carried out by heating the intermediate with the olefinic carboxylic acid or functional derivative thereof for a period of 2 to 60, usually 2 to 24 hours, at a temperature of about 50° C. up to just below decomposition temperature of any component of the reaction mixture, usually from about 120° C. to about 220° C.

As previously described, substantially inert organic liquid solvents or diluents may be used in this reaction. The inventive sulfur-containing compositions of matter can be recovered from such solvent/diluents by such standard procedure as distillation, evaporation, and the like, when desired. Alternatively, if the solvent/diluent is, for example, a base suitable for use in the functional fluid compositions of this invention, the product can be left in the solvent/diluent and used to form the lubricating, fuel or functional fluid composition as described below. The reaction mixture can be purified by conventional means (e.g., filtration, centrifugation, etc.), if desired.

While it is possible to contact the mercaptan compound with the carbonyl compound in the presence of a catalytic amount of acid in any order, it is preferable that the carbonyl compound be added to a mixture of the mercaptan compound and catalyst. The intermediate and olefinic carboxylic acid or functional derivative thereof may be contacted in any order.

While the generic and/or actual structure of many of the novel sulfur-containing reaction products of this invention are known, especially those made from single (as opposed to mixtures) reactants of known structure, the precise structures of the novel sulfur-containing reaction products prepared from mixtures of reactants, etc., is not known. For this reason, the novel sulfur-containing compositions of matter of this invention are described both by formula and in terms of the process by which they are produced.

The aforesaid invention is illustrated by the following specific examples. In these examples, as well as elsewhere in the specification and appended claims, all percentages and parts are by weight (unless otherwise stated expressly to the contrary) and the molecular weights are number average molecular weights as determined by vapor phase osmometry (VPO).

EXAMPLE 1

A mixture of 1830 parts (9 moles) n-dodecylmercaptan, 720 parts (10 moles) of isobutyraldehyde, 500 parts of toluene and 2 parts of para-toluenesulfonic acid is heated at reflux for 20 hours. During the reflux period, 155 parts of water is removed by azeotropic distillation. The reaction mixture is stripped to 160° C. under vacuum and filtered to yield 2304 parts of the desired intermediate as the filtrate.

A mixture of 279 parts (1.09 moles) of the above-described intermediate, 109 parts (1.09 moles) of maleic anhydride and 100 parts of xylene is refluxed at 200° C. for 7½ hours, then stripped at 190° C. under vacuum and filtered. The filtrate is the desired product; it contains 10.14% S and has a saponification number of 202 as determined by ASTM D-94 specifications available from the American Society for Testing Materials (ASTM), 1916 Race Street, Philadelphia, Pennsylvania 19103.

EXAMPLE 2

The general procedure of Example 1 is repeated except the n-dodecylmercaptan, isobutyraldehyde and maleic anhydride are replaced on an equimolar basis by the corresponding mercaptan(s), aldehyde(s) and/or ketone(s), and olefinic carboxyl acid(s) or functional derivative(s) thereof as shown in the following table:

| | Mercaptan(s) | Aldehyde(s) and/or Ketone(s) | Olefinic Carboxyl Acid(s) or Functional Derivative(s) Thereof |
|---|---|---|---|
| A) | butyl- | stearaldehyde | acrylic acid/methacrylic acid (50/50)w |
| B) | hexyl- | tetradecanal | methyl methacrylate |
| C) | t-nonyl- | 3-phenyl-2-methylpropanal | pentaerythritol acrylate |
| D) | t-dodecyl- | 2-ethyl-butyraldehyde | maleic anhydride |
| E) | n-dodecyl- | 2-ethyl-butyraldehyde | maleic anhydride |
| F) | n-dodecyl- | 2-butanone | citraconic acid |
| G) | t-dodecyl- | 3-hexanone | maleic anhydride |
| H) | n-dodecyl- | 4-heptanone/2-heptanone(1/1)m | acrylic acid |
| I) | t-nonyl- | 2-methyl-3-butanone/ 2-ethyl butyraldehyde (75/25)w | maleic acid |
| J) | cyclohexyl- | hexahydrobenzaldehyde | cinnamic acid/fumaric acid(1/1)m |
| K) | polybutenyl (Mn = 300 VPO)- | propionaldehyde/n-butyraldehyde (50/50)w | maleic acid |
| L) | tetrapropenyl thiophenol | stearaldehyde/tetradecanol (50/50)w | See (a) below |
| M) | t-octyl-/t-decyl(50/50)w | 3,3-dimethylpentanal | acryloyl chloride |
| N) | pentyl-/tetradecyl-(1/1)m | di-n-propylacetaldehyde | acrylamide |

(a) The amide prepared from the reaction of one mole of maleic anhydride and one mole of diethylene triamine.

EXAMPLE 3

An acylated amine derivative (predominantly a mixture of amides and imides) of the product of Example 2(K) is prepared by heating a mixture of 478 parts of the product of Example 2(K), 300 parts of mineral oil and 189 parts of a commercial ethylene polyamine mixture substantially corresponding in empirical formula to tetraethylene pentamine at 155°–165° C. for eight hours while water is removed. The mixture is stripped at 165° C. under vacuum and filtered to yield as the filtrate an oil solution of the desired product.

EXAMPLE 4

An ester of the product of Example 2(A) is prepared by bubbling ethylene oxide through 4,030 parts of the product of Example 2(A) and 10 parts of lithium carbonate at 145°-155° C. until a weight gain of 440 parts is obtained. The reaction mixture is stripped at 145° C. under vacuum. The desired β-hydroxy ester is obtained as a filtrate after filtration.

EXAMPLE 5

A mixture of 500 parts (2.5 moles) 2,9-paramethanedithiol, 360 parts (5 moles) of isobutyraldehyde, 500 parts of toluene and 2 parts of para-toluenesulfonic acid is heated at reflux for 15 hours. During the reflux period, 95 parts of water is removed by azeotropic distillation. Mineral oil (985 parts) is added to the reaction mixture which is then stripped to 160° C. under vacuum and filtered to yield an oil solution of the desired intermediate as the filtrate.

A mixture of 858 parts (3 moles) of the oil solution of the above-described intermediate, 150 parts (1.5 moles) of maleic anhydride and 100 parts of xylene is refluxed at 160°-180° C. for 7 hours, then stripped at 170° C. under vacuum and filtered. The filtrate is an oil solution of the desired product.

Additional esters acylated nitrogen compounds, etc., can be prepared from the corresponding carboxyl compounds as described in the examples above and previously discussed in this specification according to conventional procedures known to those of ordinary skill in the art, such as those illustrated in such examples. Also, the carboxyl compounds and functional derivatives thereof (e.g., esters, amides, etc.) can be hydrolyzed to the corresponding carboxylic acid by conventional techniques such as heating in the presence of water in the presence or absence of acid or base (e.g.,

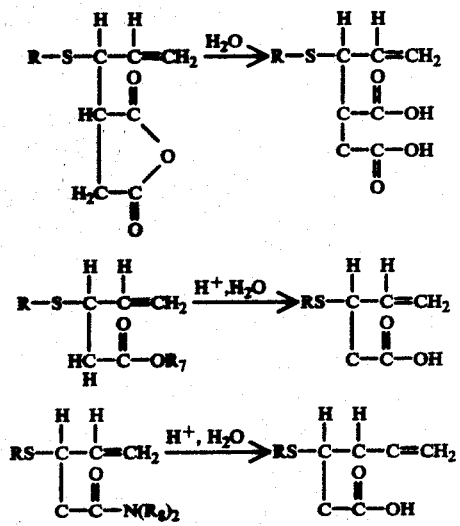

wherein R, R$_7$ and R$_8$ has been previously defined).

As previously indicated, the condensation products of this invention are useful as additives in preparing lubricant compositions where they function primarily as oxidation and rust inhibitors, particularly where the oil is subjected to high temperature environments or to cyclic stresses such as those encountered in stop-and-go automobile driving. The products of this invention can be employed in a variety of lubricant compositions based on diverse oils of lubricating viscosity, including natural and synthetic lubricating oils and mixtures thereof. These lubricant compositions include crankcase lubricating oils for spark-ignited and compression-ignited internal combustion engines, including automobile and truck engines, two-cycle engines, rotary engines, marine and railroad diesel engines, and the like. In addition, automatic transmission fluids, transaxle lubricants, gear lubricants, metal-working lubricants, hydraulic fluids and other lubricating oil and grease compositions can also benefit from the incorporation therein of the products of the present invention.

Natural oils useful in making these compositions include animal oils and vegetable oils (e.g., castor oil, lard oil) as well as liquid petroleum oils and solvent-refined or acid-refined mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, etc.); and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500-1000, diethyl ether of polypropylene glycol having a molecular weight of 1000-1500, etc.) or mono- and polycarboxylic esters thereof, for example, the acetic acid esters, mixed $C_3$-$C_8$ fatty acid esters, or the $C_{13}$ Oxo acid diester of tetraethylene glycol.

Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, ethylene glycol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as trimethylolpropane, pentaerythritol, dipentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-2-tetraethyl)silicate, tetra-(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

The preferred lubricating oils which serve as base stocks for the lubricant compositions of this invention have viscosities ranging from about 100 centistokes at 0° F. to about 2000 centistokes at 210° F.

Generally, the lubricant compositions of the present invention contain an amount of one or more of the compound or reaction products of this invention sufficient to provide the composition with oxidation- and rust-inhibiting properties. Generally this amount will be from about 0.05 to about 10, usually from about 0.1 to about 5% of the total weight of the lubricant composition. In lubricating oils operated under extremely adverse conditions, such as lubricating oils for marine diesel engines, the reaction products of this invention may be present in amounts of up to about 15% by weight.

The lubricant compositions of the present invention can contain, in addition to the products of this invention, other additives that are normally used in lubricants. Such additives include, for example, detergents of the ash-forming and of the ashless type, viscosity index improving agents, pour-point depressants, antifoam agents, extreme pressure agents, other rust-inhibiting agents, other oxidation- and corrosion-inhibiting agents.

The normally liquid fuel compositions of this invention are generally derived from petroleum sources, e.g., normally liquid petroleum distillate fuels, though they may include those produced synthetically by the Fischer-Tropsch and related processes, the processing of organic waste material or the processing of coal, lignite or shale rock. Such fuel compositions have varying boiling ranges, viscosities, cloud and pour points, etc., according to their end use as is well known to those of skill in the art. Among such fuels are those commonly known as motor gasoline, diesel fuels, kerosene, distillate fuels, heating oils, residual fuels, bunker fuels, etc. The properties of such fuels are well known as illustrated, for example, by ASTM Specifications D #396-73 (Fuel Oils) and D #439-73 (Gasolines) available from the American Society for Testing Materials ("ASTM"), 1916 Race Street, Philadelphia, Pennsylvania 19103.

The fuel compositions of the present invention generally contain from about 0.0003% to about 5% (based on the total weight of the final composition), usually about 0.001% to about 1%, of the above-described condensation and post-treated products. The presence of these products impart oxidation- and rust-inhibiting characteristics to the fuel composition.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, other anti-oxidants such as 2,6-ditertiary-butyl-4-methylphenol, other rust inhibitors, bacteriostatic agents, gum inhibitors, metal deactivators, upper cylinder lubricants and the like.

The compounds or reaction products of this invention can be added directly to the fuel or lubricant to be treated or they can be diluted with a substantially inert, normally liquid, organic solvent/diluent such as benzene, xylene, toluene, petroleum distillates, including the various oils and normally liquid fuels described in detail above to form an additive concentrate. These concentrates generally contain about 10% to about 90% of the novel sulfur-containing compositions of matter and can contain, in addition, any of the above-described, known additives. Such concentrates are then blended or mixed with the appropriate quantities of lubricating oil or normally liquid fuel, optionally, with other additives, to form a final lubricant or fuel composition.

The lubricant and fuel compositions of this invention are exemplified by the following:

EXAMPLE A

A lubricating composition suitable for use as a crankcase lubricating composition is prepared using a base oil, a mixture of 61% by volume of a 100N lubricating oil and 39% by volume of a 200N mineral lubricating oil, and as additives, by weight: 7.5% of a polyisodecylacrylate viscosity improver; 4% of a dispersant which is a reaction product of a polybutenyl-substituted succinic anhydride and pentaerythritol in 1:1 equivalent ratio which is further reacted with (a) demulsifier (an adduct of an alcohol and propylene oxide and ethylene oxide) and (b) a pentaethylene hexamine prepared as in U.S. Pat. No. 3,836,470; 2% of a dispersant prepared by reacting a polybutenyl-substituted succinic anhydride with an alkylene polyamine; 1.0% of a dispersant prepared by post-treating the reaction product of a polybutenyl-substituted succinic anhydride and an alkylene polyamine with an aromatic carboxylic acid; 0.7% of a commercially available detergent which is a basic magnesium salt of a petroleum sulfonic acid; 0.004% of a silicone based anti-foam agent; 0.3% of a zinc salt of a phosphorodithioic acid and 0.5% of the product of Example 2(I). The novel sulfur-containing succinic acid product of this invention is included in this formulation, principally, as a rust inhibitor.

EXAMPLE B

The sulfur-containing succinic acid product in Example A is replaced on an equal weight basis, with the product of Example 1; with the product of Example 2(D).

EXAMPLE C

A lubricating composition suitable for use as an automatic transmission fluid, is prepared using a base oil, a mixture of 90% by volume of a 110 neutral mineral oil and 10% by volume of a 200 neutral mineral oil, and as additives, by weight: 4% of a styrene-alkylmaleate copolymer reacted with a nitrogen-containing compound prepared as in U.S. Pat. No. 3,702,300, as a viscosity improver; 2.0% of a commercially available, proprietary seal swell agent; 1% of the reaction product of a polybutenyl-substituted succinic anhydride, tetraethylene pentamine and boric acid prepared as in U.S. Pat. No. 3,254,025; 0.3% of a commercially available diphenylamine-based oxidation inhibitor; 0.1% of a dialkylphosphite; 0.5% of a conventional friction modifier based on polyoxyethylene tallowamine (Ethomeen T/12); 0.3% of the product of Example 4. In this composition, the betahydroxy ester of the succinic acid sulfur-containing compound functions primarily to improve the oxidation stability of the composition.

EXAMPLE D

In this example, the product of Example 4 in Example D is replaced on an equal weight basis, with the product of Example 2(B); with the product of Example 2(C).

EXAMPLE E

A gasoline having a Reid vapor pressure of 8.4 psi and containing 2 grams of lead per gallon as tetraethyl lead and 20 parts per million parts of gasoline of the reaction product described in Example 2(H).

EXAMPLE F

A diesel fuel containing 40 parts per million parts of fuel of the reaction product described in Example 2(A).

EXAMPLE G

A lubricating composition, suitable for use as an automatic transmission fluid, is prepared using as a base oil, an alkylated aromatic synthetic lubricating oil; and, as additives, by weight; 3.0% of a boron-containing acylated nitrogen-based dispersant prepared from polybutenyl succinic anhydride, tetraethylene pentamine and boric acid as in U.S. Pat. No. 3,254,025; 3% of a carbon disulfide post-treated dispersant prepared from polyisobutenyl succinic anhydride, tetraethylene pentamine and carbon disulfide as in U.S. Pat. No. 3,200,107; 0.5% of a sulfurized mixture of soybean oil/$C_{12}$-$C_{20}$ $\alpha$-olefins and $C_{12}$-$C_{18}$ fatty acids; 0.5% of the product of Example 4; 0.1% of a di-lower alkyl hydrogen phosphite; 0.1% of a hindered amine anti-oxidant; 0.2% of Ethomeen T/12 as a friction modifier; and 0.3% of a mineral oil. The beta-hydroxy ester of the succinic acid sulfur-containing compound functions primarily to improve the oxidation stability of the composition.

As is apparent to those of ordinary skill in the art, many other specific fuel and lubricant compositions falling within the scope of this invention can be prepared by substituting for all or a portion of the compounds or reaction products of this invention used in the immediately preceding examples other such compounds and/or reaction products in amounts described hereinbefore. Similarly, additional conventional additives for lubricants and fuels can be incorporated in the amounts usually employed. Likewise, different fuel and lubricant base stocks can be used.

The lubricant and liquid fuel compositions of this invention and the processes for preparing these products have been specifically exemplified above to aid those skilled in the art in understanding and practicing the invention. Many obvious variations and departures from the specific disclosure will be apparent to those of skill in the art based on principles and teachings herein and in the prior art. Such variations and departures are contemplated as being within the scope of the present invention unless clearly excluded by the appended claims.

What is claimed is:

1. A process comprising first reacting, in the presence of a catalytic amount of an acid selected from the group consisting of mineral acids and organic acids, (A) at least one mercaptan of the formula R-$(SH)_m$, wherein R is a hydrocarbyl radical and m' is from 1 to about 5 with (B) at least one carbonyl compound of the formula

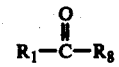

wherein $R_8$ is

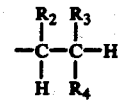

and each of $R_1$, $R_2$, $R_3$ and $R_4$ is independently hydrogen or a hydrocarbyl radical, to form an intermediate which is subsequently reacted with (C) at least one olefinic carboxylic acid or functional derivative thereof.

2. The sulfur-containing reaction mixture prepared according to the process of claim 1.

3. An additive concentrate comprising about 20-90% of at least one reaction mixture of claim 2 and a substantially inert, normally liquid, organic diluent.

4. A lubricant composition comprising a major amount of an oil of lubricating viscosity and from about 0.05% up to about 15% of at least one reaction mixture of claim 2.

5. A fuel composition comprising a major amount of a normally liquid fuel and from about 0.0003% up to about 5% of at least one reaction mixture of claim 2.

6. A process comprising first reacting, in the presence of a catalytic amount of an acid selected from the group consisting of mineral acids and organic acids, (A) at least one mercaptan of the formula R-$(SH)_{m'}$ wherein R is a hydrocarbyl radical and m' is from 1 to about 5 with (B) at least one carbonyl compound of the formula

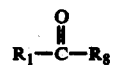

wherein $R_8$ is

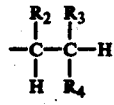

and each of $R_1$, $R_2$, $R_3$ and $R_4$ is independently hydrogen or a hydrocarbyl radical, to form an intermediate which is subsequently reacted with (C) at least one member selected from the group consisting of

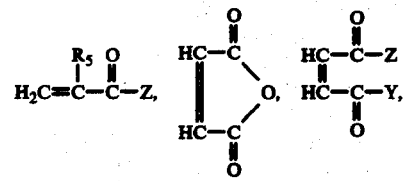

and mixtures of two or more of any of these wherein $R_5$ is hydrogen or a lower alkyl radical and each of Z and Y is independently a member selected from the group consisting of halo, —$OR_6$, —OM, —O(Alkylene-O)$_n$—$R_6$, —$N(R_7)_2$, —$NR_7$(Alkylene-$NR_7$)$_n R_7$, —$ON(R_7)_4$, and —$ON(R_7)_3$(Alkylene-$NR_7$)$_n R_7$, wherein n has an average value of about one to about ten, M is a metal cation wherein the metal is selected from the group consisting of Group Ia, Ib, IIa, IIb, IVa, IVb, Va, Vb, VIa, VIb, VIIb, VIII of the periodic table; each $R_6$ is independently hydrogen or a hydrocarbyl radical; each $R_7$ is independently hydrogen, a hydrocarbyl radical or a hydroxy-substituted hydrocarbyl radical; the alkylene group has from about one to about ten carbon atoms, and Z and Y, when taken together as part of the same reactant (C), form an $>N-R_7$ or $>N-(Alkylene-NR_7)_nR_7$ group wherein alkylene is as above defined.

7. A process according to claim 6 wherein R is an aliphatic radical of at least six carbon atoms.

8. A process according to claim 7 wherein each of $R_1$, $R_2$, $R_3$ and $R_4$ is independently hydrogen or a lower alkyl radical.

9. A process according to claim 8 wherein R is alkyl or alkenyl of at least six carbon atoms.

10. A process according to claim 9 wherein $R_8$ is

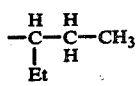

wherein Et is ethyl.

11. A process according to claim 10 wherein reactant (C) is

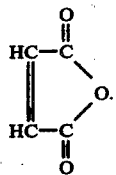

12. The process according to claim 11 wherein the molar ratio of reactants (A):(B):(C) is about 1:1:1.

13. The sulfur-containing reaction mixture prepared according to the process of claim 6.

14. The sulfur-containing reaction mixture prepared according to the process of claim 12.

15. The sulfur-containing reaction mixture prepared according to the process of claim 7.

16. The sulfur-containing reaction mixture prepared according to the process of claim 8.

17. An additive concentrate comprising about 20-90% of at least one reaction mixture of claim 13 and a substantially inert, normally liquid, organic diluent.

18. An additive concentrate comprising about 20-90% of at least one reaction mixture of claim 14 and a substantially inert, normally liquid, organic diluent.

19. An additive concentrate comprising about 20-90% of at least one reaction mixture of claim 15 and a substantially inert, normally liquid, organic diluent.

20. An additive concentrate comprising about 20-90% of at least one reaction mixture of claim 16 and a substantially inert, normally liquid, organic diluent.

21. A lubricant composition comprising a major amount of an oil of lubricating viscosity and from about 0.05 up to about 15% of at least one reaction mixture of claim 13.

22. A lubricant composition comprising a major amount of an oil of lubricating viscosity and from about 0.05 up to about 15% of at least one reaction mixture of claim 14.

23. A lubricant composition comprising a major amount of an oil of lubricating viscosity and from about 0.05 up to about 15% of at least one reaction mixture of claim 15.

24. A lubricant composition comprising a major amount of an oil of lubricating viscosity and from about 0.05 up to about 15% of at least one reaction mixture of claim 16.

25. A fuel composition comprising a major amount of a normally liquid fuel and from about 0.0003% up to about 5% of at least one reaction mixture of claim 13.

26. A fuel composition comprising a major amount of a normally liquid fuel and from about 0.0003% up to about 5% of at least one reaction mixture of claim 14.

27. A fuel composition comprising a major amount of a normally liquid fuel and from about 0.0003% up to about 5% of at least one reaction mixture of claim 15.

28. A fuel composition comprising a major amount of a normally liquid fuel and from about 0.0003% up to about 5% of at least one reaction mixture of claim 16.

29. A fuel composition comprising a major amount of a normally liquid fuel and from about 0.0003% up to about 5% of at least one sulfur-containing compound of the formula

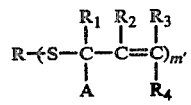

wherein R is a hydrocarbyl radical; each of $R_1$, $R_2$, $R_3$ and $R_4$ is independently hydrogen or a hydrocarbyl radical; $m'$ is from 1 to about 5; and each A is a carboxyalkyl radical wherein the carboxy substituent is at least one carboxyl group or functional derivative thereof.

30. A fuel composition comprising a major amount of a normally liquid fuel and from about 0.0003% up to about 5% of at least one sulfur-containing compound of the formula

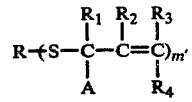

wherein R is a hydrocarbyl radical; each of $R_1$, $R_2$, $R_3$ and $R_4$ is independently hydrogen or a hydrocarbyl radical; $m'$ is from 1 to about 5; and each A is a member selected from the group of

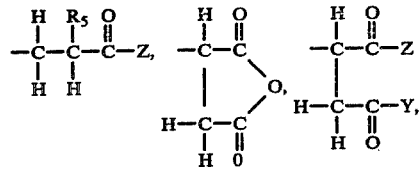

wherein $R_5$ is hydrogen or a lower alkyl radical and each of Z and Y is independently a member selected from the group of halo, $-OR_6$, $-OM$, $-O(Alkylene-O)_n-R_6$, $-N(R_7)_2$, $-NR_7(Alkylene-NR_7)_nR_7$, $-ON(R_7)_4$, and $-ON(R_7)_3(Alkylene-NR_7)_n-R_7$, wherein n has an average value of about one to about ten; M is a metal cation, wherein the metal is selected from the group consisting of Group Ia, Ib, IIa, IIb, IVa, IVb, Va, Vb, VIa, VIb, VIIb, VIII of the periodic table, each $R_6$ is independently hydrogen or a hydrocarbyl radical; each $R_7$ is independently hydrogen, a hydrocarbyl radical or a hydroxy-substituted hydrocarbyl radical; each Alkylene group independently has from one to about 10 carbon atoms; and Z and Y, when taken together as part of a single A group, form an >N-R₇ or >N-(Alkylene-NR₇)ₙR₇ group.

31. A fuel composition according to claim 30 wherein R is an aliphatic radical of at least six carbon atoms.

32. A fuel composition according to claim 31 wherein each of $R_1$, $R_2$, $R_3$, and $R_4$ is independently hydrogen or a lower alkyl radical.

33. A fuel composition according to claim 32 wherein m' is 1, R is n-dodecyl, $R_2$ is —$CH_2$—$CH_3$, $R_3$ is —$CH_3$, each of $R_1$ and $R_4$ is hydrogen, and each Y and Z is independently halo or —$OR_6$.

34. A fuel composition according to claim 32 wherein m' is 1, R is n-dodecyl, $R_2$ is —$CH_3$, each of $R_1$, $R_3$ and $R_4$ is hydrogen, and each Y and Z is independently halo or —$OR_6$.

35. A fuel composition comprising a major amount of a normally liquid fuel and from about 0.0003% up to about 5% of at least one sulfur-containing compound of the formula

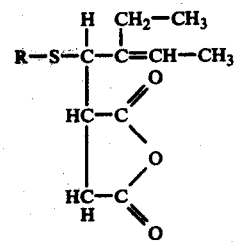

wherein R is alkyl or alkenyl of at least six carbon atoms up to about 20 carbon atoms.

36. A fuel composition comprising a major amount of a normally liquid fuel and from about 0.0003% up to about 5% of at least one sulfur-containing compound of the formula

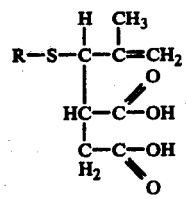

wherein R is alkyl or alkenyl of at least six carbon atoms up to about 20 carbon atoms.

* * * * *